Jan. 12, 1965
K. M. ALLEN ETAL
3,165,197
VIBRATING CONVEYOR
Filed Feb. 11, 1963
2 Sheets-Sheet 1
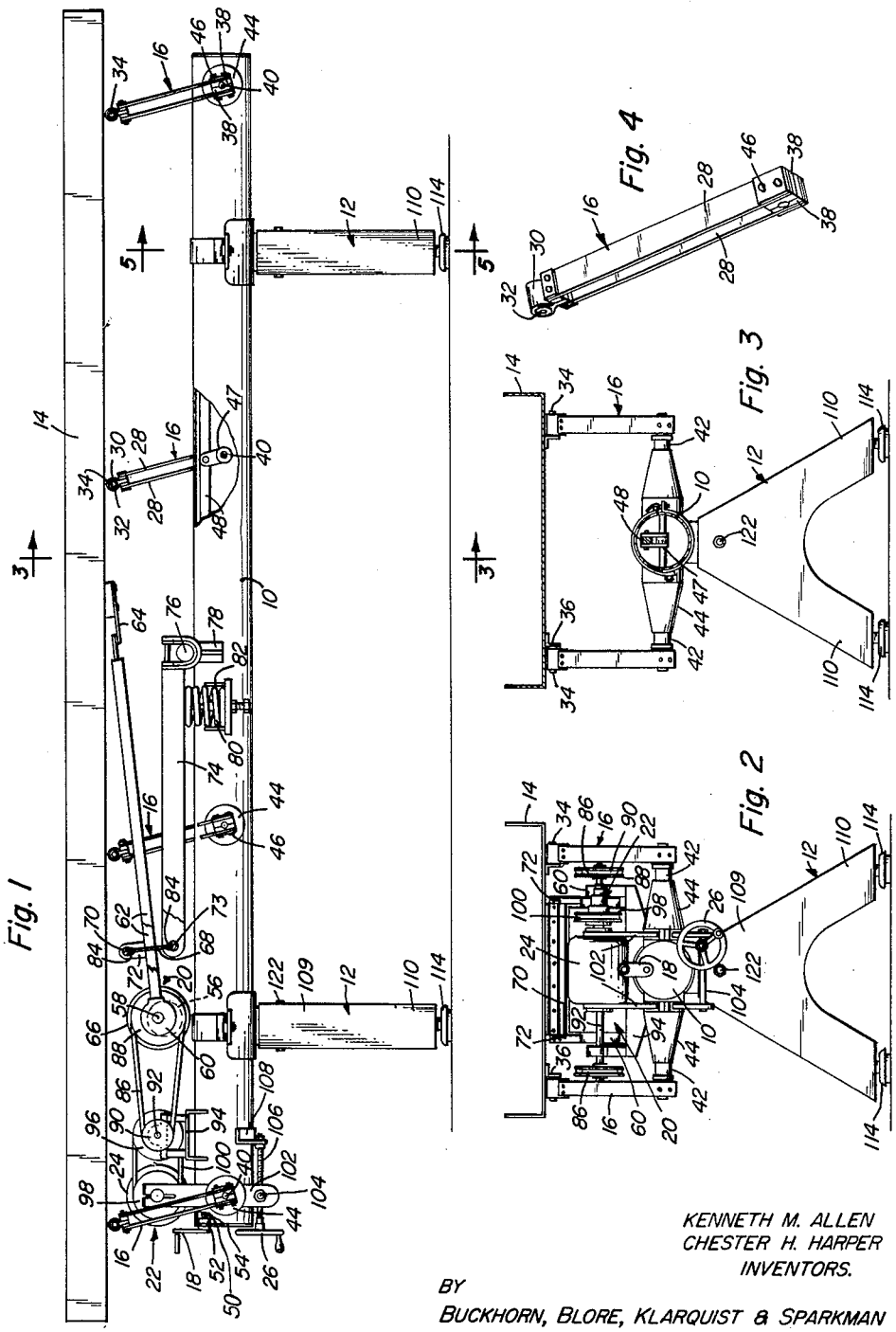
KENNETH M. ALLEN
CHESTER H. HARPER
INVENTORS.
BY
BUCKHORN, BLORE, KLARQUIST & SPARKMAN
ATTORNEYS

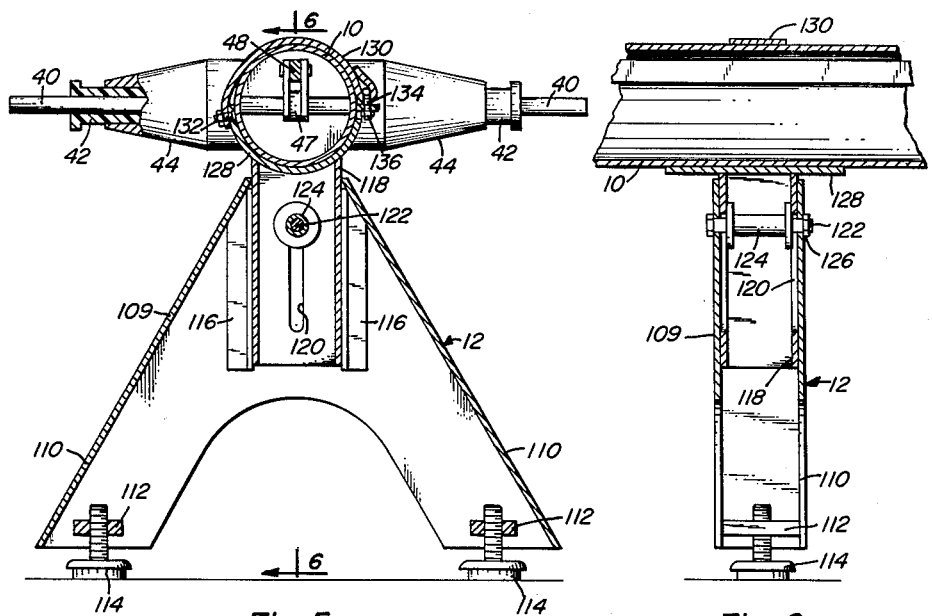
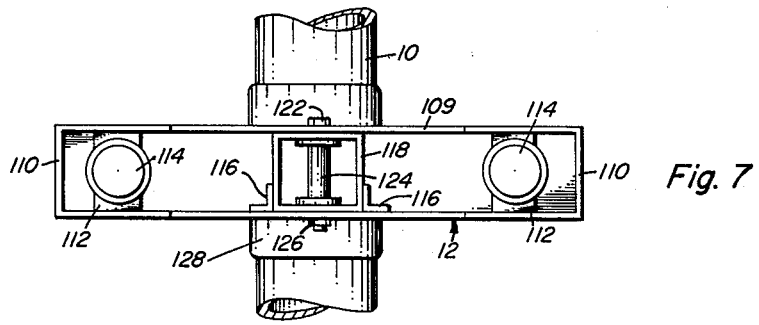
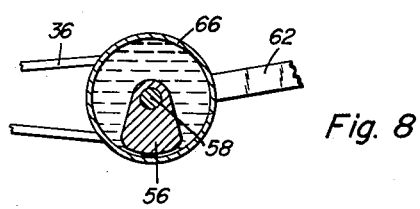

United States Patent Office 3,165,197
Patented Jan. 12, 1965

3,165,197
VIBRATING CONVEYOR
Kenneth M. Allen and Chester H. Harper, Newberg, Oreg., assignors to Allen-Harper, Inc., Newberg, Oreg., a corporation of Oregon
Filed Feb. 11, 1963, Ser. No. 257,452
8 Claims. (Cl. 198—220)

This invention relates to a vibrating conveyor and more particularly to a vibrating conveyor of simple construction which has provision for rapid and accurate adjustment of the feeding rate and which may be quickly and easily installed and leveled upon uneven floors or other support surfaces.

The conveyor of the present invention includes a conveyor table supported upon a plurality of upwardly extending flexible parallel links. The links are in turn supported by being secured to a plurality of parallel shafts which can be simultaneously rotated to adjust the average inclination of the links with respect to the vertical so as to adjust the feeding rate of the conveyor. In the preferred construction the shafts are all journaled in an elongated tubular frame member in spaced relation along such member and so that they extend laterally through the frame member. The adjusting mechanism for simultaneously rotating the shafts can thus be positioned within the frame member except for an exteriorly extending actuating member so as to simplify the cleaning of the conveyor and eliminate as far as practicable crevices and recesses adjacent the table top for lodging of materials, such as food products, being conveyed.

The elongated tubular frame member also lends itself to the attachment of easily adjustable support structures for supporting the frame member and table supported thereby upon a supporting surface so that the table can be quickly and easily adjusted to a desired position even upon uneven support surfaces. The tubular frame member also provides a lightweight and strong support for the conveyor table and for an electric motor and conveyor table vibrating mechanism.

It is therefore an object of the present invention to provide an improved vibrating conveyor of simple and easily adjustable construction.

Another object of the invention is to provide a vibrating conveyor in which an elongated tubular frame member is employed for supporting the conveying table and its supporting links so as to enable the structure to be more easily cleaned and maintained in a sanitary condition than previous constructions.

Another object of the invention is to provide simple and easily adjustable supporting structures for the frame of the vibrating conveyor to enable the conveyor to be rapidly installed upon and the conveyor table to be easily positioned with respect to an uneven supporting surface.

Other objects and advantages of the invention will appear in the following description of a preferred embodiment of the invention made in connection with the attached drawing of which:

FIG. 1 is a side elevation of a vibrating conveyor in accordance with the present invention with parts broken away to show structure otherwise hidden;

FIG. 2 is an end elevation looking toward the right in FIG. 1;

FIG. 3 is a vertical sectional view taken on the line 3—3 of FIG. 1;

FIG. 4 is an isometric view of one of the link structures for supporting the conveyor table;

FIG. 5 is a vertical sectional view on an enlarged scale with portions broken away and taken on the line 6—6 of FIG. 1 and showing the interior structure of one of the support structures for the conveyor frame;

FIG. 6 is a fragmentary vertical sectional view taken on the line 7—7 of FIG. 6;

FIG. 7 is a bottom view of the support structure of FIGS. 5 and 6; and

FIG. 8 is a fragmentary vertical section through an unbalanced weight structure employed for vibrating the conveyor table.

Referring more particularly to the drawings, the vibrating conveyor of FIG. 1 includes an elongated tubular frame member 10 supported upon a pair of similar support structures 12, and a conveyor table 14 supported above the frame member 12 by a plurality of similar and parallel upwardly extending link structures 16 which can be simultaneously adjusted with respect to their inclination to the vertical by turning a crank 18 as described below. It also includes a mechanism indicated generally at 20 for vibrating the table and a driving and variable speed mechanism indicated generally at 22 providing a support for an electric motor 24 and including a speed adjusting control wheel 26.

The link structures 16 for supporting the table 14 on the frame member 10 are most clearly shown in FIG. 4 and each include a pair of parallel flexible strips 28 spaced from each other and secured at their upper ends to a bushing holding member 30. The bushing holding member receives a rubber bushing 32 and bolts 34 extend through the rubber bushings and brackets 36 secured to the lower portion of the table 14 to provide resilient pivotal connections of the upper ends of the flexible link structures 16 to the table 14.

The lower ends of the flexible strips 28 are secured to clamping blocks 38 positioned upon each side of the end of one of a plurality of cross shafts 40, each journaled in bearings 42 which are preferably of nylon. The bearings 42 are carried in bearings supports 44 secured to and extending laterally of the frame member 10, as most clearly shown in FIG. 5. The link structures 16 are omitted in FIG. 5 but, as shown in FIG. 1, bolts 46 extending through the strips 28 and blocks 38 clamp the lower ends of the link structures 16 securely to the cross shafts 40. The cross shafts 40 are spaced from each other longitudinally of the frame member 10 and extend laterally through such frame member.

The angular positions of the shafts 40 can be simultaneously adjusted to thereby simultaneously adjust the inclination of the link structures with respect to the vertical. To accomplish this, each of the shafts 40 is provided with a crank member 47 secured thereto within the frame member 10 and including a pair of parallel arms. An adjusting connecting rod 48 extending longitudinally of and within the frame member 10 is received between and is pivotally connected to the upper ends of the arms of the crank member 47. The connecting rod terminates at one end in a circular threaded portion 50 (FIG. 1) received in a nut 52 journaled in an end closure member 54 for the frame member 10 and held against longitudinal movement relative to the frame member. The crank 18 is secured to the nut 52 and it will be apparent that turning the crank 18 will impart longitudinal motion to the connecting rod to simultaneously rotate the shafts 40 and thus adjust the incinations of the link structures 16.

The flexible strips 28 of the link structures 16 are preferably made of a plastic impregnated glass fiber but can be made of other resilient material, and it will be apparent that the table 14 is resiliently supported above the frame member 10 so that it can be vibrated generally longitudinally of the frame member 10 with a horizontal vibratory motion also having a vertical component. As is well known in the conveyor art, vibration of the table in the manner just described will cause material upon the upper surface of the table to be fed along the table.

The rate of feed for a given amplitude and speed of vibration can be adjusted by adjusting the angularity of the flexible supporting links 16, and this can be accomplished by turning the crank 18.

The vibration of the table 14 is accomplished by rotating an eccentric or unbalanced weight 56 shown in dotted lines in FIG. 1 and in full lines in FIG. 8. The weight 56 is journaled for rotation about a shaft 58 which is in turn journaled in laterally spaced bearing members 60 (FIGS. 1 and 2), each secured to the end of a connecting rod 62. Each connecting rod has its other end connected to the table by a flexible strip 64 which may be of the same general type of material as the flexible strips 28 of the link structures 16. The unbalanced weight is housed in a cylindrical housing 66 secured to the shaft 58 concentrically therewith and filled with a suitable liquid, such as lubricating oil. It will be apparent that at slow speeds during starting and stopping of the rotation of the shaft 58, the weight 56 will remain substantially stationary due to slippage of the liquid in the housing 66 but that at higher speeds the frictional contact of the fluid with the housing will cause the weight to rotate with the shaft 58. The rotation of the eccentric weight causes vibration of the ends of the connecting rods 62 having the bearing members 60. The connecting rods extend generally longitudinally of the table 14 so that rotation of the eccentric weight causes vibration of the table to feed material on its upper surface longitudinally of the table as described above.

The ends of the connecting rods 62 supporting the unbalanced weight 56 and the oil filled housing are in turn supported on a vertically extending plate 68 providing a compression link having its upper end bearing in a groove in a cross member 70 extending between brackets 72 carried by the connecting rods, the cross member 70 thus fastening the connecting rods together. The lower ends of the link plate 68 bears in a similar groove in a cross member 73 extending between and secured in a pair of support arms 74 having their other ends each journaled on an end of a cross shaft 76 secured in a bracket 78 in turn secured to the upper portion of the frame member 10. The arms 74 each bear on the upper end of a vertically extending compression coil spring 80 having its lower end positioned in a socket 82 secured to a side of the frame member 10. The upper and lower ends of the link plate 68 each has a slotted cylindrical bearing member 84, preferably made of nylon, positioned thereon. The grooves in the cross members 70 and 73 are semicylindrical to receive such bearing members.

It will be apparent from the above description that the end of the connecting rods 62 are resiliently supported by the springs 80 and that the table can be moved longitudinally with respect to the frame member 10 when the inclination of the link structures 16 is adjusted without disturbing the resilient support of the ends of the connecting rods 62 supporting the unbalanced weight 56. Also the transition between no rotation of the eccentric weight and rotation thereof can be made to occur at a speed of rotation of the shaft 58 which is above the critical speed thereof provided by the resilient supporting system just described so that violent vibration during stopping and starting of the vibrating conveyor does not occur.

The shaft 58 and cylindrical housing 66 secured thereto are rotated by a pair of resilient and flexible belts 86 engaging grooved pulleys 88 secured on the ends of the shaft 58. The belts also engage corresponding pulleys 90 secured on the ends of a jack shaft 92. The jack shaft 92 is journaled in bearings forming part of a bearing mounting 94 secured to the upper portion of the frame member 10 so that the shaft 92 is positioned above and extends laterally of the frame member. The belts 86 are sufficiently resilient that the pulleys 88 may be moved longitudinally of the frame member 10 relative to the pulleys 90 when the inclination of the link members 16 is adjusted as above described.

Another pulley 96 is secured to the jack shaft 92 in alignment with a pulley 98 on the shaft of the motor 24. A belt 100 engages grooves in the pulleys 96 and 98 to drive the jack shaft 92 from the motor 24. The motor shaft pulley 98 is of the spring pressed variable diameter type so that movement of the motor 24 toward and away from the jacket shaft 92 will vary the speed of the jack shaft and therefore the speed of the shaft 58 with respect to the shaft of the motor 24.

In order to provide for adjustment of the position of the motor 24 with respect to the jack shaft 92, the motor is mounted between the upper ends of a pair of arms 102 which have their central portions journaled on a pair of the bearing supports 44 for the bearing of one of the cross shafts 40. A cross shaft 104 extending between the lower ends of the arms 102 carries a threaded nut (not shown) which is threaded on a screw 106 journaled in and held against longitudinal movement by a bracket 108 secured to the lower portion of the frame member 10. The hand wheel 26 is secured on the end of the screw 106 adjacent the end of the frame member 10 and it will be apparent that turning the hand wheel 26 will vary the speed of the shaft 58 upon which the eccentric or unbalanced weight 56 is journaled.

The support structures 12 for the frame member 10 have body portions 109 which are of hollow construction and of generally triangular shape when viewed in end elevations so as to provide laterally spaced legs 110. As most clearly shown in FIGS. 5 to 7, each leg 110 has an interior cross piece 112 adjacent its lower end which threadedly receives the threaded upper shank of a bearing pad 114. It will be apparent that the bearing pads 114 are thereby individually adjustable vertically with respect to the respective legs 110 of the support structures 12.

The upper portions of the support structures 12 each have a centrally disposed opening below which is positioned vertically extending spaced guide elements 116 providing a guide structure. A support element 118 has a lower portion of hollow rectangular shape received within and fitting the interior of the body portion 109 of the support structure and also received in and fitting the guide structure provided by the guide elements 116. Opposed sides of the lower portion of each of the support elements 118 have vertically extending slots 120 therein through which a bolt 122 extends. The bolt 122 also extends through aligned holes in the sides of the body portion 109 of the support structure 12 and a sleeve 124 having enlarged ends surrounds the bolt and extends between the sides of the lower portion of the support element 118. It will be apparent that the support element can be adjusted vertically and that tightening a nut 126 on the bolt 122 will clamp the support element in vertically adjusted position in the support structures 12.

The upper portion of each support element provides a semicircular socket or saddle member 128 fitting and receiving the frame member 10. As shown most clearly in FIG. 5, a strap clamping member 130 is secured at one end to one side of the saddle 128 by a bolt 132 and extends over the frame member 10. At the other end of the clamping member 130, a T bolt 134 extends through the bight of a bent back portion of the clamping member and also through a flanged end of the saddle member 128. It will be apparent that tightening the nut 136 on the T bolt will clamp the frame member 10 in the saddle member and that loosening the nut 136 will enable the frame member 10 to be angularly adjusted in the saddle member.

In installing the conveyor on an uneven support surface, the leg bearing pads 114 can be adjusted to an approximate intermediate vertical position with respect to the legs 110. The top of the table 14 can then be brought approximately to its desired height and level or inclination by loosening the nuts 126 and 136 on the bolts 122 and 134 so as to enable the support elements 118 to be vertically adjusted in the support structures 12 and the frame member 10 to be rotated in the saddle members 128. The nuts 126 and 136 can then be tightened and any desired fine adjustment made by adjusting the vertical position of the bearing pads with respect to the legs 110 of the support structures. The desired position of the vibration table is thus easily and rapidly obtained and any subsequent adjustments of such position are also easily and rapidly effected.

In operating the conveyor, starting of the motor 24 will cause the shaft 58 having the eccentric weight 56 journaled thereon to increase in speed and the liquid in the housing 66 carried by the shaft 58 will cause the eccentric weight 56 to begin to rotate after the shaft 58 has passed through the critical or resonant speed of the system. The reverse occurs when the motor 24 is stopped. The weight 56 ceases rotating before the critical speed is reached. The final speed of rotation of the shaft 58 can be adjusted by turning the hand wheel 26. Rotation of the eccentric weight 56 resulting from rotation of the shaft 58 causes vibration of the table 14. The inclination of the link structures 16 can be adjusted by turning the crank 18 to adjust the feeding rate of the conveyor table. Both adjustments can be made while the conveyor is running so that a desired total feeding effect for a given interval or given operation is easily and rapidly obtained.

We claim:
1. A vibrating conveyor comprising:
an elongated horizontally extending frame,
a plurality of horizontally extending parallel shafts journaled in and spaced longitudinally of said frame,
a plurality of flexible parallel links each of which extends upwardly and has a lower portion fixed to one of said shafts,
a conveyor table supported by the upper portions of said links,
means to vibrate said table generally longitudinally of said frame,
and means to simultaneously rotate said shafts through equal angles to adjust the average angle of inclination of said links relative to the vertical.

2. A vibrating conveyor comprising:
an elongated horizontally extending central frame,
a plurality of parallel cross shafts journaled in and spaced longitudinally of said frame and having opposed ends extending laterally from said frame,
a plurality of flexible parallel links each of which extends upwardly from one of said ends and has a lower portion fixed to said one of said ends,
a conveyor table supported on the upper portions of said links,
means to vibrate said table generally longitudinally of said frame,
and adjusting means to simultaneously rotate said shafts through equal angles to adjust the average angle of inclination of said links with respect to the vertical.

3. A vibrating conveyor comprising:
an elongated horizontally extending central frame,
a plurality of parallel cross shafts journaled in and spaced longitudinally of said frame and having opposed ends extending laterally from said frame,
a plurality of flexible parallel links each of which extends upwardly from one of said ends and has a lower portion fixed to said one of said ends,
a conveyor table supported on the upper portions of said links,
means to vibrate said table generally longitudinally of said frame,
adjusting means to simultaneously rotate said shafts through equal angles to adjust the average angle of inclination of said links with respect to the vertical,
said adjusting means including a plurality of parallel crank members each of which is secured to the central portion of one of said shafts,
a connecting member extending longitudinally of said frame and pivotally connected to each of said crank members,
and means for longitudinally adjusting said connecting member.

4. A vibrating conveyor comprising:
a frame including an elongated horizontally extending hollow frame member,
a plurality of parallel cross shafts spaced longitudinally of said frame member and journaled in and extending laterally through said frame member and having opposed ends extending from said frame member,
a plurality of flexible parallel links each of which extends upwardly from one of said ends and has a lower portion fixed to said one of said ends,
a conveyor table supported on the upper portions of said links, means to vibrate said table generally longitudinally of said frame,
a plurality of parallel crank members positioned within said frame member each of which is secured to one of said shafts,
an elongated connecting member extending longitudinally within said hollow member and pivotally connected to each of said crank members,
and adjusting means at one end of said hollow member for longitudinally moving said connecting member to vary the average angle of inclination of said links with respect to the vertical.

5. A vibrating conveyor comprising:
a frame including a horizontally extending tubular frame member,
a conveyor table extending longitudinally of and positioned above said frame member,
means for supporting said table on said frame member including a plurality of parallel horizontally extending cross shafts longitudinally spaced along and extending through said frame member,
said means also including a plurality of parallel flexible links extending upwardly from and fixed to the ends of said cross shafts and having their upper portions connected to said table,
means supported on said frame member for vibrating said table,
and means positioned within said frame member and having an actuating member extending to the exterior of said frame member for adjustably and simultaneously rotating said shafts through equal angles to vary the average inclination of all of said links relative to the vertical.

6. A vibrating conveyor comprising:
an elongated horizontally extending tubular frame member,
an elongated horizontally extending conveyor table positioned above and extending longitudinally of said frame member,
means including a plurality of parallel links for supporting said table from said frame member,
frame support structures spaced longitudinally of said frame member and each having a body portion and an upper support portion receiving and fitting said frame member and a lower portion providing laterally spaced lower support portions for engaging a support surface,
said upper support portion including clamping means extending over said frame member for clamping said frame member in adjusted position on said support structures.

7. A vibrating conveyor comprising:
an elongated horizontally extending tubular frame member,
an elongated horizontally extending conveyor table positioned above and extending longitudinally of said frame member,
means including a plurality of parallel links for supporting said table from said frame member,
frame support structures spaced longitudinally of said frame member and each having a body portion and an upper support portion receiving and fitting said frame member and a lower portion providing laterally spaced lower support portions for engaging a support surface, said upper support portion including clamping means extending over said frame member for clamping said frame member in adjusted position on said support structures, said upper support portion being mounted upon a downwardly extending member secured to said body portion for vertical adjustment.

8. A vibrating conveyor comprising:

an elongated horizontally extending tubular frame member, an elongated horizontally extending conveyor table positioned above and extending longitudinally of said frame member, means including a plurality of parallel links for supporting said table from said frame member, frame support structures spaced longitudinally of said frame member and each having a body portion and an upper support portion receiving and fitting said frame member and a lower portion providing laterally spaced lower support portions for engaging a support surface, said upper support portion including clamping means extending over said frame member for clamping said frame member in adjusted position on said support structures, said body portion of each of said support structures being of hollow construction and having an upwardly directed opening and a guide structure adjacent said opening, said upper support portion having a downward extension extending through said opening and received in said guide structure for vertical adjustment in said support structure, and means to clamp said extension in said guide portion in adjusted position.

References Cited in the file of this patent

UNITED STATES PATENTS

| | | |
|---|---|---|
| 926,320 | Croner | June 29, 1909 |
| 2,563,081 | Tanner | Aug. 7, 1951 |
| 2,705,889 | Hock | Apr. 12, 1955 |

FOREIGN PATENTS

| | | |
|---|---|---|
| 1,047,708 | Germany | Dec. 24, 1958 |
| 1,155,606 | France | May 6, 1958 |